United States Patent [19]
Stepanov et al.

[11] Patent Number: 6,063,143
[45] Date of Patent: May 16, 2000

[54] PROCESS FOR PRODUCING ELECTRODES FOR CHEMICAL SOURCES OF ELECTRIC ENERGY

[75] Inventors: Aleksei Borisovich Stepanov; Igor Nikolaevich Varakin; Vladimir Vasilievich Menukhov, all of Saratov, Russian Federation

[73] Assignee: Aktsionernoe Obschestvo Zakrytogo Tipa "Elton", Moscow, Russian Federation

[21] Appl. No.: 08/817,254

[22] PCT Filed: Aug. 14, 1995

[86] PCT No.: PCT/RU95/00170

§ 371 Date: Apr. 11, 1997

§ 102(e) Date: Apr. 11, 1997

[87] PCT Pub. No.: WO97/07554

PCT Pub. Date: Feb. 27, 1997

[51] Int. Cl.$^7$ .............. H01M 4/26; H01M 4/66
[52] U.S. Cl. ............ 29/623.5; 429/223; 429/235; 429/245
[58] Field of Search .................. 429/223, 233, 429/235, 245, 40, 41, 42; 29/623.1, 623.5; 427/115

[56] References Cited

U.S. PATENT DOCUMENTS

| | | |
|---|---|---|
| 3,351,487 | 11/1967 | Levine et al. .................. 136/86 |
| 3,900,601 | 8/1975 | Franz et al. .................. 427/108 |
| 3,962,494 | 6/1976 | Nuzzi .................. 427/304 |
| 4,039,714 | 8/1977 | Roubal et al. .................. 428/336 |
| 4,331,521 | 5/1982 | Chisholm et al. .................. 204/98 |
| 4,564,424 | 1/1986 | Cassat et al. .................. 204/20 |
| 4,590,115 | 5/1986 | Cassat .................. 428/174 |
| 4,935,110 | 6/1990 | Nishiki et al. .................. 204/20 |
| 5,032,475 | 7/1991 | Hasebe et al. .................. 429/60 |
| 5,384,216 | 1/1995 | Teraoka et al. .................. 429/223 |
| 5,445,720 | 8/1995 | Sypula et al. .................. 204/181.1 |
| 5,458,955 | 10/1995 | Vaughn et al. .................. 428/212 |
| 5,561,002 | 10/1996 | Sakamoto et al. .................. 429/235 |
| 5,563,235 | 10/1996 | Farnham .................. 528/244 |

FOREIGN PATENT DOCUMENTS

| | | |
|---|---|---|
| 2 472 842 | 7/1981 | France . |
| 1827039 | 7/1993 | U.S.S.R. . |
| 1 602 981 | 11/1981 | United Kingdom . |
| 91/08325 | 6/1991 | WIPO . |

*Primary Examiner*—Maria Nuzzolillo
*Assistant Examiner*—Jonathan Crepeau
*Attorney, Agent, or Firm*—McDermott, Will & Emery

[57] ABSTRACT

The invention relates to electrical engineering and can find application for making electrodes for chemical sources of electric energy—using fibrous polymer metal-coating bases. The invention has for its object to replace palladium and tin used in operations preceding chemical coating of the polymer fibrous material with a metal, with less critical materials. The object is accomplished by using a cation-exchange material having a cation-exchange capacity of 0.5–6 mg-eq/g, and metal coating is preceded by saturating the polymer material with nickel ions, followed by treating it with an aqueous solution of boron hydride of an alkali metal.

5 Claims, No Drawings

PROCESS FOR PRODUCING ELECTRODES FOR CHEMICAL SOURCES OF ELECTRIC ENERGY

TECHNICAL FIELD

The present invention relates in general to processes for producing electrodes for chemical sources of electric energy, predominantly for electrodes of storage batteries. More specifically the invention relates to a process for producing such electrodes having a polymer material as the base thereof. The invention covers also the electrodes produced with the use of the process proposed therein.

BACKGROUND ART

The present state of the art knows polymer-based electrodes for chemical sources of electric energy. Application for French Patent No.2,472,842 of 1981 can be adduced as an example. According to said application the electrode is made of a metal-coated substrate on which an active material is deposited.

One of the heretofore-known processes for producing such electrodes disclosed in FRAG Patent No.4,004,106 of 1991, consists of preliminary activation of the substrate made of polymer materials, in particular, an unwoven web from polyolefinic fibres, in a solution containing tin and palladium, followed by coating the substrate with nickel by chemical formation and electroplating.

However, the aforesaid known process for producing polymer-based electrodes suffers from a number of disadvantages, which are first and foremost due to the use of a large amount of highly expensive palladium for activating the fibrous polymer material that has a highly developed surface.

Moreover, the following formation of a metal coating on the thus-preconditioned material is likely to involve penetration of palladium particles from the polymer surface into the metal-coating solution, with the resultant decomposition of the latter.

DISCLOSURE OF THE INVENTION

The present invention has for its principal object to provide a novel process for producing polymer-based electrodes, wherein a necessity for use of expensive materials is dispensed with.

The foregoing object is accomplished due to the fact that proposed for the first time is the use of cation-exchange fibrous materials that have not so far been used for the purpose. This in turn makes it possible to activate the surface by saturating it with the ions of the same metal, i.e., nickel with which the substrate is afterwards coated.

By and large the process for producing electrodes based on the present invention is as follows. A fibrous polymer material having a cation exchange capacity of 0.5 to 6.0 mg-eq/g is taken. The material can be treated with a sodium bicarbonate solution beforehand.

Used as sources of nickel ions may be a nickel sulfate solution, wherein the polymer is held for a period of time enough for material to be saturated with nickel ions. Thereupon the material activated with nickel ions is treated, for 0.5 to 30 minutes, with an aqueous solution of boron hydride of an alkali metal having a concentration of 0.1 to 1.2 g/l at 15–70° C. As a result, the sorbed nickel is reduced.

Then the thus-treated blanks are nickel-coated by conventional chemical formation and electroplating techniques.

EXEMPLARY EMBODIMENT OF THE INVENTION

The essence of the present invention will hereinafter be illustrated in the following exemplary embodiment thereof.

Example 1

Used as a polymer fibrous cation-exchange material is an unwoven needle-pierced felt based on radiation-grafted polypropylene having an ion-exchange capacity of 5 mg-eq/g with respect to nickel, a fiber diameter of 36 mcm, a porosity of 87%, and a thickness of 5 mm. The aforesaid material is immersed in a 2% aqueous sodium bicarbonate solution and held therein for an hour, whereupon the material is washed with deionized water and saturated with nickel ions by being treated with a 3% nickel sulfate solution for half an hour. Once having been washed the nickel-saturated blanks are treated for 15 min at 30° C. with a sodium boron hydride solution with a concentration of 0.5 g/l.

After having been treated as described before the blanks develop a dark-grey color. The thus-activated blanks are chemically nickel-coated at room temperature in a solution of the following composition, g/l:

nickel sulfate—50 ammonium chloride—35 sodium hypophosphite—40 ammonia—to pH=9.

Thereafter the blanks are nickel-plated in a standard Watts electroplating cell until a nickel content of 0.5 g/cu.cm is attained. The characteristics of the thus-produced electrode base are tabulated below.

For the sake of comparison the table contains also the characteristics of the material used in a conventional electrode base.

|  | Parameter rating | |
| --- | --- | --- |
| Parameter | Electrode base as per Example 1 | Conventional electrode base |
| Porosity, % | 84.1 | 83.4 |
| Surface weight, sq. cm/g | 280 | 221 |
| Coating thickness, mcm | 3.8 | 5.2 |
| Mean diameter, mcm | 150 | 134 |
| Mean diameter of fibres, mcm | 46.5 | 38.5 |

It follows from the table presented above that according to the principal and most important electrode characteristics the base prepared in keeping with the proposed invention is rather close to a conventional electrode base.

We claim:

1. A method of manufacturing electrodes for chemical sources of electric energy using a substrate made of cation-exchange fibrous polymer material, the method consisting essentially of:

activating a surface of the substrate with nickel ions by:
  (a) treating the fibrous polymer material directly with a nickel salt solution,
  (b) thereafter, washing the substrate,
  (c) thereafter, treating the substrate with a solution of boron hydride of an alkali metal, and
  (d) thereafter, coating an activated surface of the substrate with nickel to produce an electrode, wherein the cation-exchange fibrous polymer material has a cation-exchange capacity in the range of 0.5–6.0 mg-eq/g.

2. The method of claim 1, wherein step (c) comprises treating the substrate with an aqueous solution of sodium boron hydride having a concentration in the range of 0.1–1.2 g/l at a temperature in the range of 15–70° C. for 0.5–30.0 minutes.

3. The method of claim 1, wherein said nickel salt solution is a nickel sulfate solution.

4. The method of claim 1, wherein said substrate is treated with a sodium bicarbonate solution before treating the fibrous polymer material with the nickel salt solution.

5. The method of claim 4, wherein said substrate is washed with water after treating with the sodium bicarbonate solution.

* * * * *